United States Patent
Rallo

(10) Patent No.: US 9,274,587 B2
(45) Date of Patent: Mar. 1, 2016

(54) POWER STATE ADJUSTMENT

(71) Applicant: TSO LOGIC INC., Vancouver (CA)

(72) Inventor: Aaron Rallo, Vancouver (CA)

(73) Assignee: TSO Logic Inc., Vancouver (CA)

( * ) Notice: Subject to any disclaimer, the term of this patent is extended or adjusted under 35 U.S.C. 154(b) by 0 days.

(21) Appl. No.: 14/561,807

(22) Filed: Dec. 5, 2014

(65) Prior Publication Data

US 2015/0089258 A1    Mar. 26, 2015

Related U.S. Application Data

(63) Continuation-in-part of application No. 14/466,712, filed on Aug. 22, 2014, now Pat. No. 9,098,285, which is a continuation of application No. 13/039,214, filed on Mar. 2, 2011, now Pat. No. 8,850,243.

(51) Int. Cl.

| | |
|---|---|
| *G06F 1/26* | (2006.01) |
| *G06F 1/32* | (2006.01) |
| *G06F 9/48* | (2006.01) |
| G06F 9/50 | (2006.01) |
| G06F 11/34 | (2006.01) |

(52) U.S. Cl.
CPC ............ *G06F 1/3209* (2013.01); *G06F 1/3206* (2013.01); *G06F 1/3287* (2013.01); *G06F 9/4856* (2013.01); *G06F 1/3203* (2013.01); *G06F 1/329* (2013.01); *G06F 9/505* (2013.01); *G06F 9/5083* (2013.01); *G06F 9/5088* (2013.01); *G06F 11/3433* (2013.01); *Y02B 60/1282* (2013.01)

(58) Field of Classification Search
CPC ....... G06F 1/3203; G06F 1/329; G06F 9/505; G06F 9/5083; G06F 9/5088; G06F 11/3433
USPC ........... 713/300, 320, 323; 718/100, 102, 105
See application file for complete search history.

(56) References Cited

U.S. PATENT DOCUMENTS

| | | | |
|---|---|---|---|
| 7,177,901 | B1 | 2/2007 | Dutta |
| 8,850,243 | B2 | 9/2014 | Rallo |
| 2004/0024853 | A1 | 2/2004 | Cates et al. |
| 2005/0273456 | A1 | 12/2005 | Revanuru et al. |
| 2006/0184287 | A1 | 8/2006 | Belady et al. |
| 2006/0276216 | A1 | 12/2006 | Tongen |
| 2007/0143454 | A1 | 6/2007 | Ma et al. |
| 2008/0082604 | A1 | 4/2008 | Mansour et al. |
| 2008/0104430 | A1 * | 5/2008 | Malone et al. ............... 713/300 |
| 2010/0169477 | A1 | 7/2010 | Stienhans et al. |
| 2011/0022868 | A1 | 1/2011 | Harchol-Balter et al. |

OTHER PUBLICATIONS

International Application No. PCT/US2012/027221, International Search Report mailed May 30, 2012.

\* cited by examiner

*Primary Examiner* — Michael J Brown
(74) *Attorney, Agent, or Firm* — Sheppard, Mullin, Richter & Hampton LLP; Carina Tan

(57) ABSTRACT

A system and method for selecting devices for which power states and/or mode of operation may be adjusted can be implemented based on power supply availability, cost of power consumption at certain periods of the day or year, environmental conditions, priority of applications, and business objectives are disclosed.

9 Claims, 5 Drawing Sheets

POWER STATE ADJUSTMENT

CROSS REFERENCE TO RELATED APPLICATIONS

This application claims priority to, and is a continuation-in-part of, U.S. patent application Ser. No. 14/466,712 filed Aug. 22, 2014, entitled, "Non-intrusive Power Management," by Aaron Rallo, which is a continuation application of U.S. patent application Ser. No. 13/039,214 filed Mar. 2, 2011, now U.S. Pat. No. 8,850,243, entitled, "Non-intrusive Power Management," by Aaron Rallo, and all of which are hereby incorporated by reference in their entirety.

TECHNICAL FIELD

The disclosed embodiments relate generally to management of power supply and consumption based on application and business priorities. More particularly, the disclosed embodiments relate to methods, systems for selecting devices for which power states may be adjusted.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Figure 1:
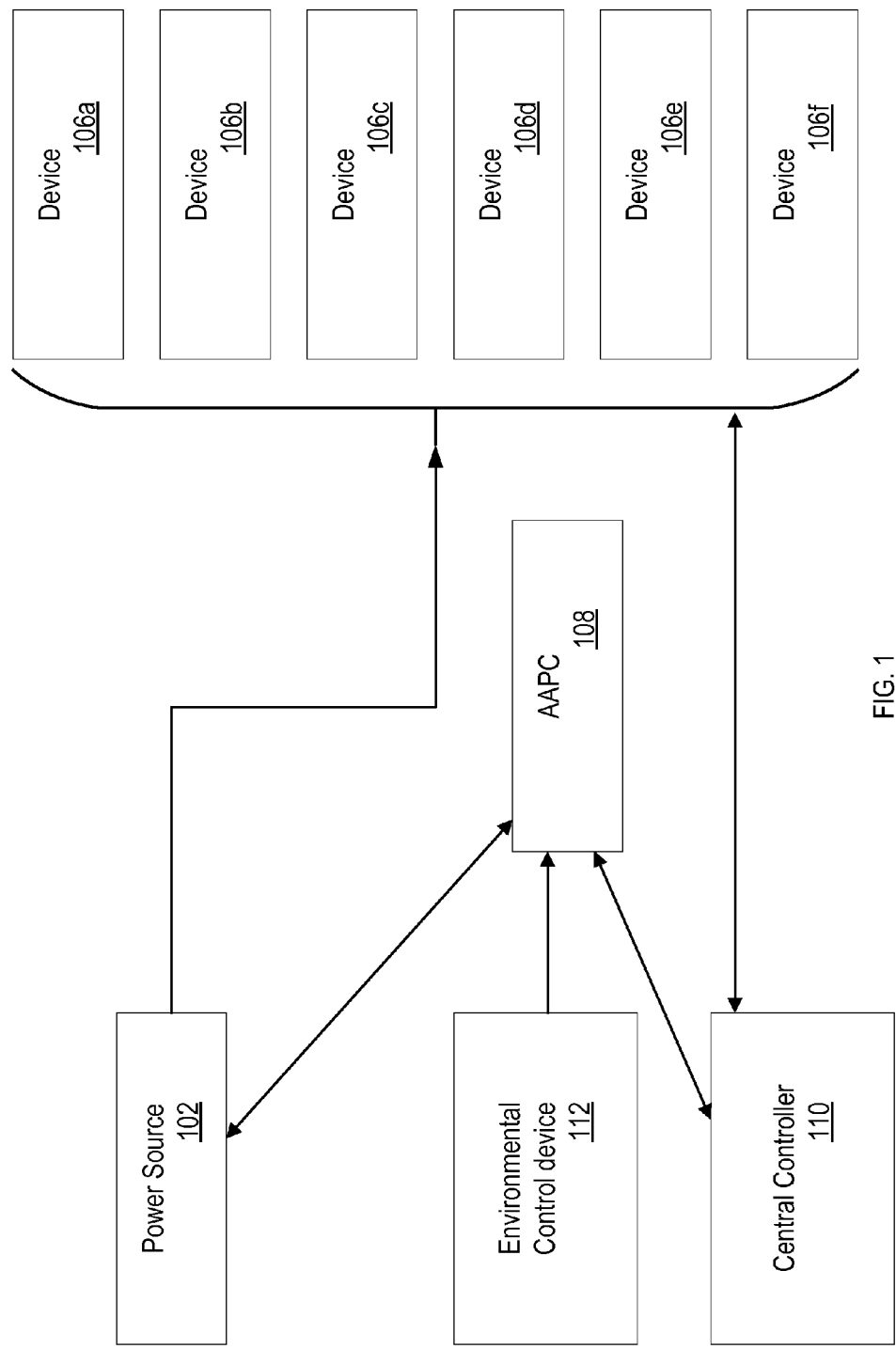
FIG. 1 is a high-level block diagram that illustrates information collection, according to certain embodiments of the invention.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a system and method for selecting devices for which power states and/or mode of operation may be adjusted can be implemented based on power availability, cost of power consumption at certain periods of the day or year, environmental conditions, priority of applications, and business objectives. As described herein, power states include sleep states, hibernate states and standby states.

According to certain embodiments, rather than relying on circuit breakers, hard wired fail safe methods or power caps, at least a subset of the plurality of devices in a target system can be selected for adjustment of power consumption (or can be turned off or turned back on) based on information including but not limited to: the nature and importance of the applications running on a given device, workloads at a given period of time, the business units that may be affected by changes in the power adjustment of various devices, cost of power consumption at a given time of day or year, the amount of power available at a given time of day, peak demand thresholds, logical position of the devices in the power supply chain, physical location of the of the devices, types and number of redundancies in the target system, types of power supply failures, frequency of power supply failures, business goals at a given period of time, and environmental factors.

According to certain embodiments, information on the priority levels of applications running on one or more devices of the plurality of devices is considered when deciding which devices are candidates for power state and/or mode of operation adjustment. According to certain embodiments, the priority levels of applications may be based on the nature and importance of the applications with respect to an enterprise, or business unit within the enterprise, for example.

According to certain embodiments, power state and/or mode of operation adjustment for a given device can include putting the device in a reduced power state from its current power state (slowing down the device and the applications that are running on the device), putting the device in an increased power state from its current power state (speeding up the device and the applications that are running on the device), turning the device off or turning the device back on if it is off, for example. Non-liming examples of changing the mode of operation of a device includes changing the spin speed of the hard drive of the device, or changing the fan speed of one or more fans in the device or shutting down one or more fans of a plurality of fans in the device or slowing down or shutting off selected applications (that are less critical) that are running on the device. Thus, a change of mode of operation can effect the power consumption of the device and the efficiency level of the device.

The types of power states for a given device depends on capabilities enabled by the device manufacturer, according to certain embodiments. For example, different power states of the device can be triggered by the operating system of the device, or through interfacing directly with the device itself by a device controller, or a computerized agent, or some other device, or a power distribution unit, etc.

The following table shows non-limiting examples of power states:

| Name | State | Description |
| --- | --- | --- |
| Full On | D0 | The device is on and running, receiving full power from the system and delivering full functionality to the user. |
| Low On | D1 | The device is fully functional, although at a lower power or performance state than D0. The D1 state is applicable for when the device is in use, but only when peak performance is unnecessary and power is at a premium. |
| Standby | D2 | The device is in a partial power consumption mode and is standing by for a wakeup request from the OS. |
| Sleep | D3 | The device is using the minimum power level that is required for supporting device-initiated wakeup. |
| Off | D4 | The device has no power. |

According to certain embodiments, information from various systems and devices in a given environment can be collected, analyzed and controlled. The systems and devices may include physical and/or virtual servers, switches, firewalls, routers, server pools, application pools, SDN (software defined networking) solutions, controllers, management modules, environmental control devices, etc. According to certain embodiments, such information can be collected and analyzed continuously or at predetermined intervals of time. Further, such information includes but is not limited to priority levels of applications running on one or more devices, location of a given device of the one or more devices, work load types, name of application, the ID of the device associated with a given application, one or more UPS (uninterruptible power supply) IDs, power outlet IDs. According to certain embodiments, work loads in a given target environment may be grouped based on various business criteria, by customer name, by importance, by the type of work being performed, and by the type of applications associated with the work load. For example, such information can be stored in one or more databases and a mapping or some other correlation can be made between applications that are running on the respective devices in the target system/environment, and the corresponding workloads associated with the running applications. Further, such information can be used in the following non-limiting ways: 1) identify which applications, application pools, company departments or workloads would be impacted in the event of one or more device failures, 2) identify which devices can be shut down or should be shut down when there is a shortage of power being supplied to the target system/environment, 3) identify which devices can have their power state reduced and/or mode of operation altered when there is a reduced rate of power supply to the target system/environment so as to redirect power to devices that are running applications of a more critical nature, 4) identify which devices should be turned on first or have their power state increased and/or mode of operation altered in the event there is an increase in the power supply rate that is being supplied to the target system/environment.

According to certain embodiments, the priority levels of given applications and work load types may be set by administrators, inherited from third party systems, or derived automatically based on use patterns and or current utilization levels.

According to certain embodiments, the power state and/or mode of operation adjustment for a given device can be performed by one or more of the following: 1) using power state capabilities inherent to the device, 2) using a device controller, 3) using a power distribution unit (PDU), 4) using an operating system on the device, and 5) using a computer-implemented agent.

According to certain embodiments, an application aware power controller (AAPC) communicates with a centralized controller and the devices in the target system/environment in order to adjust the power state and/or mode of operation of the devices that have been selected for power state and/or mode of operation adjustment based on the rate of power supply and the information collected on the devices in the target system/environment. Further, the information on the devices in the target system/environment can be reported to system administrators and to other infrastructure devices such as chillers or other environmental control devices.

FIG. 1 is a high-level block diagram that illustrates a method of collecting relevant information on the devices in a target system/environment for use in power adjustment decisions, according to certain embodiments. FIG. 1 shows a power source 102, such as an uninterruptible power supply (UPS) and or a generator or power grid (not shown) that supplies power to one or more devices 106a-f, an application aware power controller (AAPC) 108, a central source or controller 110, and a facility chiller or environmental control device 112 (hereinafter referred to as "environmental control device"). There may be numerous devices in the target system/environment but only devices 106a-f are shown in the figure. Further, the devices 106a-f may or may not be within the enclosure of another device. As non-limiting examples, devices 106a-f may include optionally one or more of the following: server farm type chassis, racks, cabinets of computers and devices or other types of computing facilities that run one or more applications, application pools, workloads and smart power distribution units (PDU). Central source or controller 110 manages the devices 106a-f. According to certain embodiments, central source or controller 110 can include one or more of: configuration management databases, spreadsheets, centralized device controllers, automated provisioning solutions, software distribution solutions, management modules, virtualization solutions, software defined networking solutions (collectively referred to as "central source or controller"), the information from which can be used to aid the central source or controller 110 in managing the devices in the target system/environment. Further, there may be a plurality of power sources supplying power to the target system/environment. The target system/environment may be broken down into zones based on functionality and on power and cooling needs.

According to certain embodiments, the AAPC 108 collects and manages information from central source or controller 110, from the devices 106a-f and optionally from power source 102 and/or environmental control device 112. The collected information can be stored in a database that can communicate with AAPC 108. The information collected from central source or controller 110 can include one or more of: priority levels of applications running on one or more devices, location of a given device of the one or more devices, work load types, name of a given application, the ID of the device associated with a given application, one or more UPS (uninterruptible power supply) IDs, outlet IDs, connection information (for example, information on how the UPS, server, and power outlets are connected).

According to certain embodiments, the priority of a given application may be set directly by the AAPC 108. According to certain other embodiments, the priority of a given application may be set automatically based on utilization rates and current workload associated with the given application.

According to certain embodiments, the information collected from the devices 106a-f in the target system/environment can include one or more of: the power-draw of a given device, performance characteristics of a given device, power control capabilities of a given device, workload characteristics of a given device, operating system of a given device and device ID of a given device.

Figure 2:
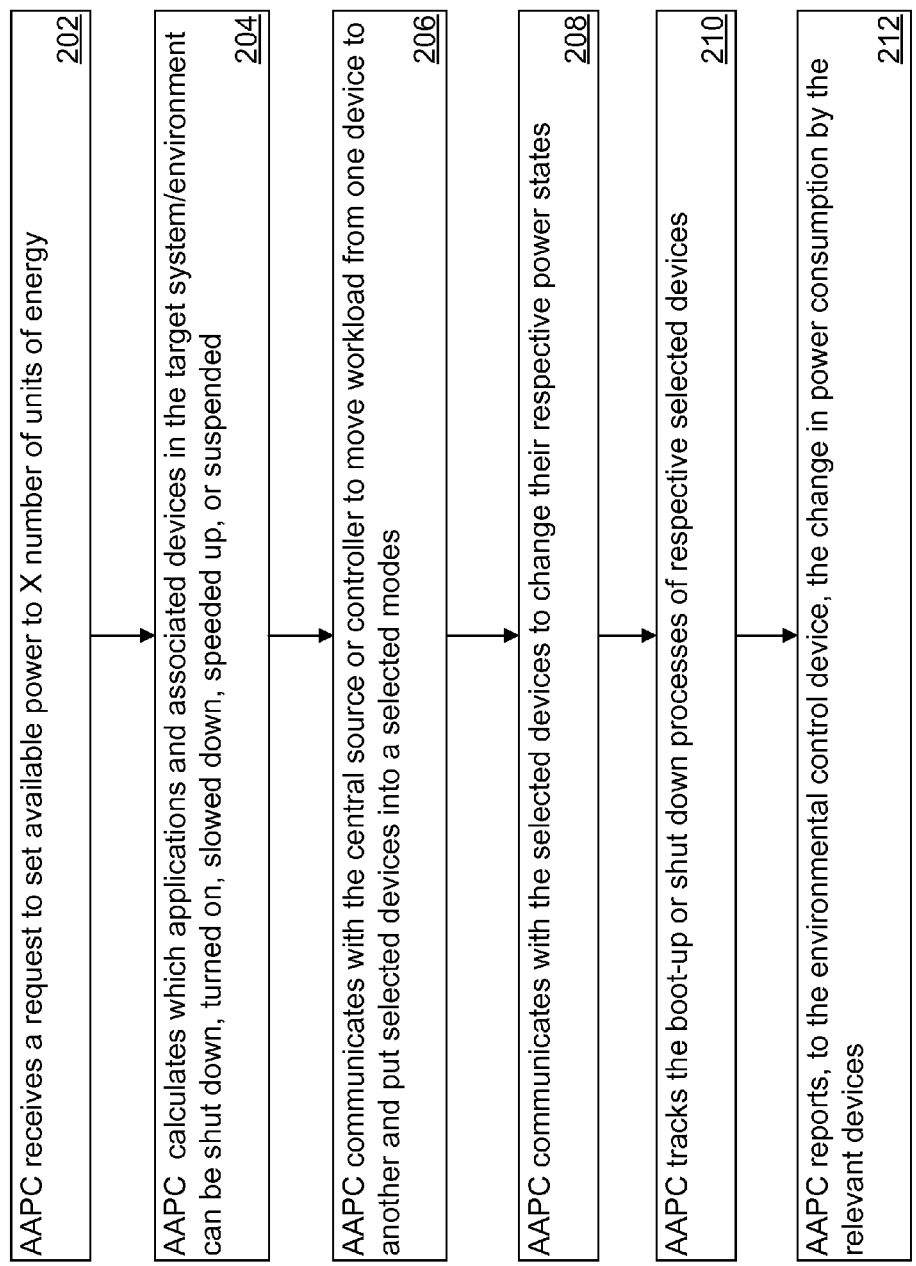
FIG. 2 is a high-level flow chart that illustrates a way of selecting devices and placing the selected devices into reduced power states or to be turned off in response to a given reduced power value, according to certain embodiments of the invention.

FIG. 2 is a high-level flow chart that illustrates a way of selecting devices and placing the selected devices into reduced power states or to be turned off and/or put into an altered mode of operation in response to a given reduced power value, according to certain embodiments of the invention.

In FIG. 2, at block 202, the AAPC 108 receives a request to set available power to X number of units of energy (referred to as "power setting request" herein) or a percentage of the total power that is currently drawn by the target system/environment based on a set of parameters such as type of power adjustment ("hard" or "soft" adjustment), and time (length of time to complete the request for power adjustment), according to certain embodiments. A "hard" power adjustment means that the changes in power state and/or mode of operation of selected devices must occur such that the requested power setting is achieved within the allotted time, according to certain embodiments. A "soft" power adjustment means that, even though some devices are selected for power state and/or mode of operation adjustment, their power states and/or mode of operation could not be adjusted and the system administrator is notified of such cases.

At block 204, using at least a subset of the information as described herein, the AAPC 108 calculates which applications and associated devices in the target system/environment can be shut down, turned on, slowed down, speeded up, or suspended based on the respective application's priority level to achieve the power setting that is requested at block 202, according to certain embodiments.

At block 206, if needed, the AAPC 108 communicates with the central source or controller 110 to move workload from one device to another and put selected devices into one of the following modes: 1) available mode, 2) unavailable mode, 3) suspended mode, 4) maintenance mode. Further, the AAPC 108 may communicate with the central source or controller 110 the reasons for the change in modes for the selected devices, according to certain embodiments.

At block 208, the AAPC 108 communicate with the selected devices to change their respective power states and/or mode of operation in order to achieve the power setting that is requested at block 202, according to certain embodiments.

At block 210, as the power state and/or mode of operation of the selected devices are being changed, the AAPC 108 tracks the boot-up or shut down processes of respective selected devices so as to limit the number of devices that are allowed to have their power states and/or mode of operation changed at any given time, according to certain embodiments. According to certain embodiments, the number of devices that are allowed to have their power states and/or mode of operation changed is an optional setting and such a setting can be stored in a database associated with the AAPC 108.

At block 212, the AAPC 108 reports, to the environmental control device 112, the change in power consumption by the relevant devices that had their respective power states and/or mode of operation altered and the location of such devices, according to certain embodiments. The AAPC 108 may also cause the generation of reports on the devices that are impacted by the power setting request, the power usage of the various devices, the efficiency levels of the various devices, the current power that a given device is drawing based on its current power state and/or mode of operation. According to certain embodiments, AAPC 108 monitors and analyzes the target system to recommend power saving strategies to achieve power savings.

Figure 3:
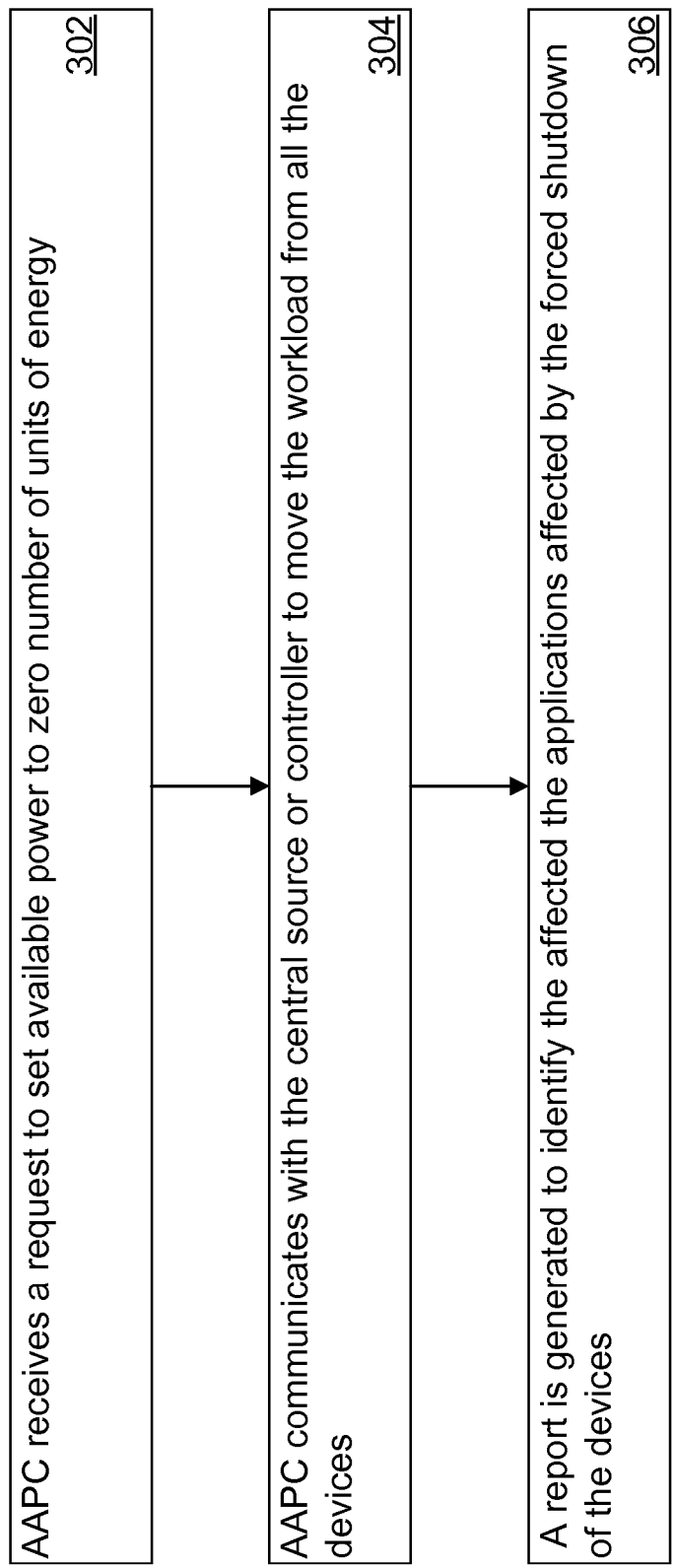
FIG. 3 is a high-level flow chart that illustrates a way of placing devices into reduced power states or to be turned off in response to a zero power value request, according to certain embodiments of the invention.

FIG. 3 is a high-level flow chart that illustrates a way of placing devices into reduced power states or turned off and/or put into an altered mode of operation in response to a zero power value request, according to certain embodiments of the invention.

In FIG. 3, at block 302, AAPC 108 receives a request to set available power to zero number of units of energy based on a set of parameters such as type of power adjustment (hard or soft adjustment), and time (length of time to complete the request for power adjustment), according to certain embodiments.

At block 304, AAPC 108 communicates with central source or controller 110 to move the workload from all the devices in the target system/environment before shutting down the respective devices in the target system/environment, according to certain embodiment. For example, for purposes of illustration, assume that the request is "power set to zero, hard, 15 minutes", then the AAPC 108 interfaces with any device that is still drawing power after 15 minutes has elapsed since the receiving the request for the zero power setting in order to shut it down, regardless of the workload of the device, according to certain embodiments.

At block 306, a report is generated to identify the affected the applications affected by the forced shutdown of the devices. As a non-limiting example, the workload from all the devices in the target system/environment may be moved to appropriate devices in other systems/environments where spare power is available.

For purposes of illustration, assume that the request is "power set to zero, soft, 15 minutes", then any applications and devices that could not be shutdown are identified by a user interface associated with AAPC 108 in order to alert the system administrator who may deploy other corrective action, according to certain embodiments.

Figure 4:
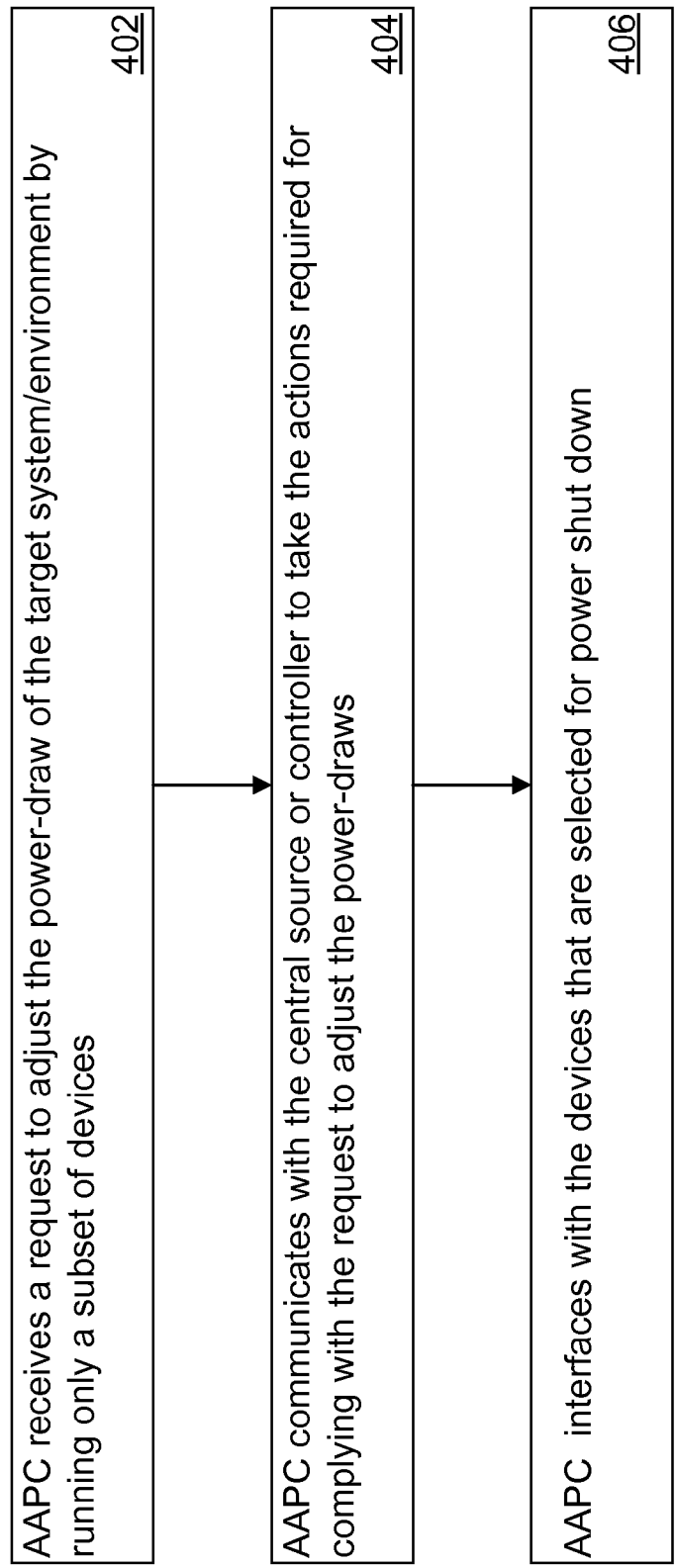
FIG. 4 is a high-level flow chart that illustrates a way of adjusting power-draw for the target system/environment by running only a subset of devices in the target system/environment based on the priority level of the respective applications running on devices in the target system/environment, according to some embodiments.

FIG. 4 is a high-level flow chart that illustrates a way of adjusting the power-draw of the target system/environment by running only a subset of devices in the target system/environment based on the priority level of the respective applications running on devices in the target system/environment, according to some embodiments.

In FIG. 4, at block 402, AAPC 108 receives a request to adjust the power-draw of the target system/environment by running only a subset of devices in the target system/environment based on the priority level of the respective applications running on the devices. As a non-limiting example, the request may be to continue powering devices that are running applications with a priority of 1 to X or to continue powering devices that are designated as "critical."

At block 404, AAPC 108 communicates with central source or device controller 110 to take the actions required for complying with the request to adjust the power-draw of the target system/environment by running only a subset of devices. An example action would be to adjust the power states and/or modes of operation of one or more devices (turn off, turn on, put into hibernation mode, standby mode, sleep mode, adjust fan speed of one or more fans of the device, turn off or turn on one or more fans of the device, adjust spin speed of hard drive of the device) in the target system/environment based on the power that is available to the target system/environment.

At block 406, AAPC 108 interfaces with the devices that are selected for power shut down.

Figure 5:
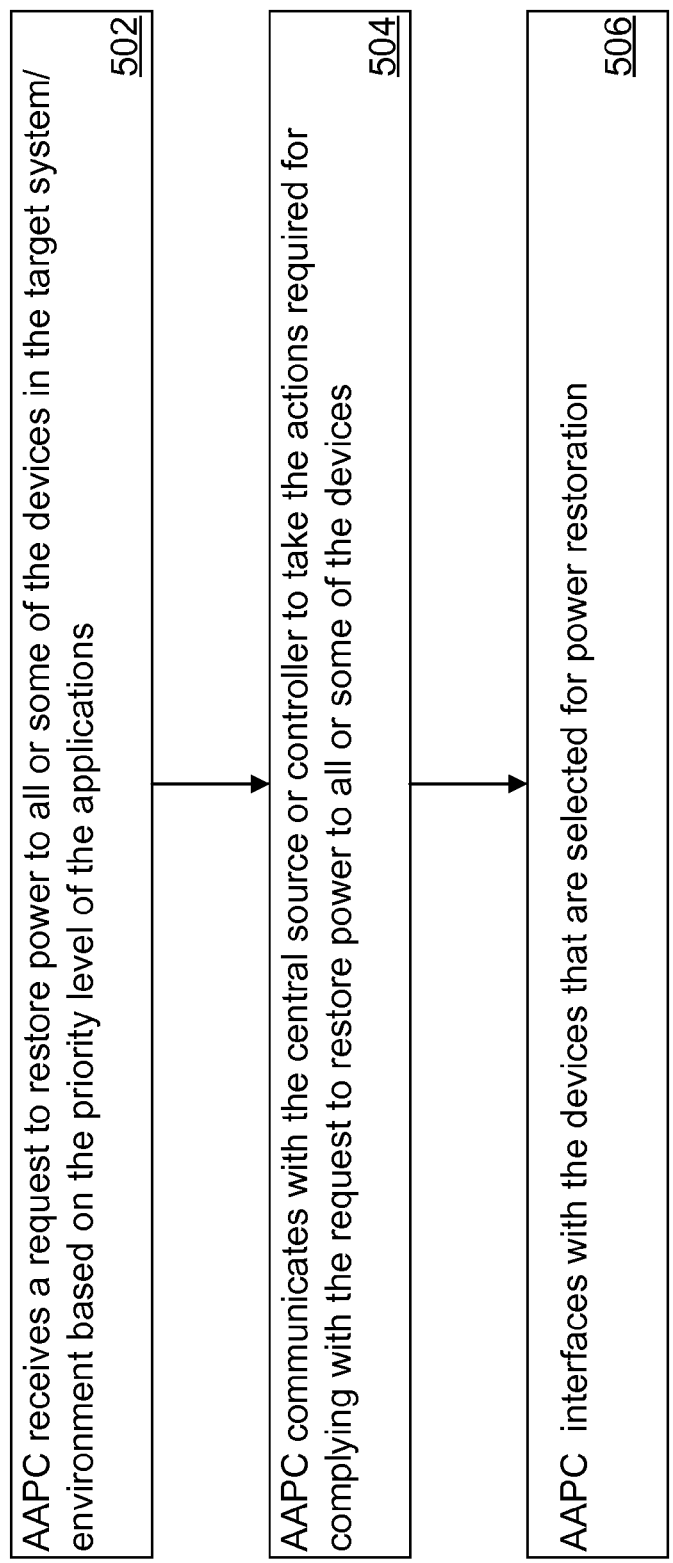
FIG. 5 is a high-level flow chart that illustrates a way of restoring power states for selected devices, according to some embodiments.

FIG. 5 is a high-level flow chart that illustrates a way of restoring power states and/or mode of operation for selected devices, according to some embodiments.

In FIG. 5, at block 502, AAPC 108 receives a request to restore power to all or some of the devices in the target system/environment based on the priority level of the applications that are supposed to be running on the respective devices.

At block 504, AAPC 108 communicates with central source controller 110 to take the actions required for complying with the request to restore power to all or some of the devices in the target system/environment based on the priority level of the applications that are supposed to be running on the respective devices. At block 506, AAPC 108 interfaces with the devices that are selected for power restoration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A system comprising:
at least one power controller for controlling power consumption of respective devices of a plurality of devices in a target system, wherein:
the at least one power controller receives a power setting request for the target system; and
the at least one power controller determines which devices of the plurality of devices can be slowed down, speeded up, turned off, turned on, or suspended, based on at least:
the received power setting request;
priority levels of respective applications that are running on the respective devices;
real-time load information including incoming requests to the plurality of devices; and
impact on performance of respective applications that are running on the respective devices.

2. The system of claim 1, further comprising one or more controllers in communication with the at least one power controller to move workload from a first subset of devices in the target system to a second subset of devices in the target system.

3. The system of claim 2, wherein the at least one power controller communicates with the one or more controllers to put selected devices in the target system in any one mode from: 1) available mode, 2) unavailable mode, 3) suspended mode, 4) maintenance mode, 5) partially available mode, and 6) any mode that is supported by the one or more controllers.

4. The system of claim 1, wherein the at least one power controller analyzes and controls one or more of: 1) nature and importance of applications running on a respective device, 2) workloads in the target system at a given period of time, 3) business units that may be affected by changes in power adjustment of respective devices, 4) cost of power consumption at a given time of day or year, 5) amount of power available at a given time of day, 6) peak demand thresholds, 7) business goals at a given period of time, 8) environmental factors in the target system, 9) location of a respective device in the target system, 10) work load types, 11) physical location of a respective device in the target system, 12) logical location of a respective device in a power supply chain, 13) name of the respective application, 14) ID of device associated with a respective application, 15) ID of one or more uninterruptible power units, 16) power outlet IDs, 17) types of redundancies associated with the target system, 18) number of redundancies associated with the target system, 19) types power supply failures, 20) frequency of power supply failures, and 21) environmental factors.

5. The system of claim 1, wherein the target system comprises one or more of: 1) virtual servers, 2) physical servers, 3) switches, 4) firewalls, 5) routers, 6) server pools, 7) application pools, 8) software defined networking solutions, 9) controllers, 10) management modules, and 11) environmental control device.

6. The system of claim 1, wherein the at least one power controller is involved in identifying which applications, application pools, company departments or workloads would be impacted by non-operation of one or more devices in the target system.

7. The system of claim 1, wherein the at least one power controller is involved in identifying which devices can be shut down or should be shut down, should be turned on or have their power state increased or have their mode of operation altered if there is a change in availability in supply of power to the target system.

8. The system of claim 1, wherein the at least one power controller is involved in identifying which devices can have their power state reduced and/or have their mode of operation altered so as to redirect power to devices that are running critical applications.

9. The system of claim 1, wherein the at least one power controller monitors and analyzes the target system to recommend power saving strategies to achieve power savings.

* * * * *